Patented Sept. 28, 1948

2,449,994

UNITED STATES PATENT OFFICE 2,449,994

BETA ACYLOXY ACYL HALIDES FROM BETA LACTONES

Thomas L. Gresham and Forrest W. Shaver, Akron, Ohio, assignors to The B. F. Goodrich Company, New York, N. Y., a corporation of New York No Drawing. Application November 28, 1945, Serial No. 631,497

5 Claims. (Cl. 260—488)

This invention relates to organic compounds which are beta-acyloxy acyl halides and to the preparation of such compounds by the reaction of an acyl halide and a beta-lactone.

It is disclosed in U. S. Patent 2,356,459 to Frederick E. Küng, that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

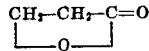

is economically obtained from ketene and formaldehyde.

We have now discovered that beta-propiolactone, and also the other beta-lactones, will react with acyl halides to produce beta-acyloxy acyl halides, and that these compounds are useful as intermediates in the preparation of other organic compounds many of which are plasticizers, and for various other purposes.

The reaction proceeds as represented by the following general equation:

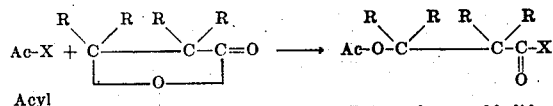

wherein Ac is an acyl radical (that is, a radical of the structure

where R' is an organic radical, either aliphatic, alicyclic, aromatic or heterocyclic in nature, having its connecting valence on a carbon atom); X is a halogen atom such as chlorine, bromine or iodine; and R is hydrogen or a substituent radical.

In carrying out the reaction no special conditions are necessary, the reaction proceeding whenever the reactants are brought into effective contact with one another. When working with liquid reactants, the reaction is preferably effected by adding the beta-lactone to the acyl halide at a temperature below room temperature, preferably from about −30 to 30° C. and in the absence of other materials. However, these conditions are by no means critical since beta-acyloxy acyl halides are also obtained by reacting acyl halides and beta-lactones in the presence of inert solvents or diluents such as benzene or ether (such a substance being preferred if one or both of the reactants is a solid), and at higher temperatures, for example, at the temperature of reflux of the reactants.

As a specific example illustrating the invention, 144 parts by weight (2 moles) of beta-propiolactone are added over a period of about three hours to 171 parts by weight (about 2.18 moles) of acetyl chloride with constant stirring and while cooling the reaction mixture to a temperature of about 0° C. The liquid reaction mixture is then distilled at reduced pressure and a principal fraction consisting of about 168 parts by weight of a liquid boiling at 90–105° C./35 mm. is obtained. Redistillation of this liquid yields 107 parts by weight of substantially pure beta-acetoxy propionyl chloride,

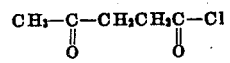

B. P.=100–103.5° C./35 mm.; $N_D^{20}$=1.4374.

The beta-acetoxy propionyl chloride thus obtained may be reacted with alcohols to yield esters of beta-acetoxy propionic acid which, as disclosed in the copending application of Thomas L. Gresham and Jacob Eden Jansen Ser. No. 620,658, filed October 5, 1945, are quite useful organic compounds. It may be reacted with ammonia and amines to produce amides of beta-acetoxy propionic acid, and with various other compounds having an active hydrogen to form beta-acetoxy-propionyl derivatives.

Numerous other beta-acyloxy acyl halides which are also liquid materials and which undergo similar reactions, are prepared by the reaction of other acyl halides with beta-lactones. For example, propionyl chloride reacts with a substantially equimolecular proportion or less of beta-propiolactone to yield beta-propionoxy propionyl chloride. Similarly, with an equimolecular proportion or less of beta-propiolactone, caproyl chloride yields beta-caproxy propionyl chloride, lauroyl chloride yields beta-lauroxy propionyl chloride, stearoyl chloride yields beta-stearoxy propionyl chloride, acrylyl chloride yields betaacryloxy propionyl chloride, benzoyl chloride yields beta-benzoyloxy propionyl chloride, phenylacetyl chloride yields beta-phenylacetoxy propionyl chloride, succinyl chloride yields (with two molecular proportions of beta-propiolactone) beta-succinoxy-dipropionyl chloride

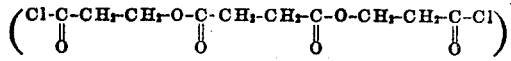

phthalyl chloride yields (with two molecular proportions of beta-propiolactone) beta-phthaloxy-dipropionyl chloride, and other acyl chlorides composed of carbonyl chloride structure

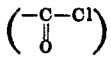

connected to hydrocarbon structure yield other beta-acyloxy propionyl chlorides of the formula

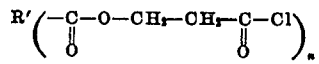

wherein R' is a hydrocarbon radical and $n$ is an integer corresponding to the valence of the hydrocarbon radical. Acyl bromides and iodides corresponding to the above-mentioned acyl halides may also be used to produce beta-acyloxy acyl bromides and iodides, but the use of acyl chlorides is preferred.

In addition to the unsubstituted acyl halides of the type described above, which aside from the functional

group are composed of a hydrocarbon residue, substituted acyl halides wherein the residue contains other elements such as halogens, oxygen, nitrogen and sulfur in addition to carbon and hydrogen, may also be reacted with beta-lactones to produce other beta-acyloxy acyl halides. Thus, chloro-acetyl chloride, dichloro-acetyl chloride, beta-chloro propionyl chloride, p-bromobenzoyl chloride, p-methoxy-benzoyl chloride, furoyl chloride, 3,5-dinitro-benzoyl chloride and the like react with beta-propiolactone to produce the corresponding beta-acyloxy propionyl halides.

The beta-acyloxy acyl halides of this invention are themselves substituted acyl halides and will also react with beta-lactones with the result that beta-polyacyloxy acyl halides are obtained. Accordingly, when an excess of beta-propiolactone, which is preferably from 2 to 10 molecular proportions, is reacted with one molecular proportion of acetyl chloride, the product contains beta-acetoxy-propionoxy propionyl chlorides of the formula

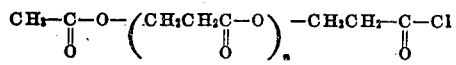

wherein $n$ is an integer which may vary from 1 to a number which is one less than the number of moles of beta-lactone used for each mole of acyl halide, these products being derived by the reaction of the beta-acetoxy propionyl chloride first formed with the additional quantity of beta-propiolactone. These compounds, as well as similar compounds produced by using other acyl halides in place of acetyl chloride, are of considerable value since they may be reacted with alcohols to produce esters of beta-polyacyloxy carboxylic acids which are useful as plasticizers, as is disclosed in the above-mentioned copending application of Thomas L. Gresham and Jacob Eden Jansen.

While the invention has been described hereinabove with particular relation to beta-acyloxy propionyl halides which are obtained by reacting acyl halides with beta-propiolactone, the invention is not limited thereto. Although beta-propiolactone is the preferred beta-lactone, because of its low cost and ease of reactivity, the homologs of beta-propiolactone, that is other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-butyl-beta-propiolactone, alpha-methyl-beta-butyrolactone, beta-methyl-beta-valerolactone and the like, may also be used to produce other beta-acyloxy acyl halides. Similarly other lactones of beta-hydroxy monocarboxlic acids including those containing cycloalkyl, aryl and aralkyl substituents, such as beta-cyclohexyl-beta-propiolactone, beta-phenyl-beta-propiolactone, alpha-phenyl-beta-propiolactone, beta-benzyl-beta-propiolactone and the like may also be used. All of the above-mentioned beta-lactones are of the general structure

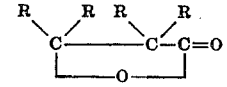

wherein R is hydrogen or an unreactive hydrocarbon group (i. e., a hydrocarbon group free from aliphatic unsaturation) and may be prepared in the manner described in the above-mentioned Küng patent. Still other beta-lactones are known and are also contemplated by this invention. Among these are beta-lactones of unsaturated beta-hydroxy carboxylic acids, mono-lactones of dicarboxylic acids and dilactones of dicarboxylic acids in which at least one of the lactones is beta. Examples of these lactones include alpha, alpha-dimethyl-beta-propiolactone-beta carboxylic acid; trimethyl-beta-propiolactone-beta-carboxylic acid; beta-beta-dimethyl-beta-propiolactone-alpha-carboxylic acid; and the beta-delta-dilactone of cityrilidene malonic acid, all of which like the beta-lactones before mentioned, are, except for carbonoxy structure

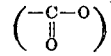

composed exclusively of hydrogen and carbon atoms. Still other beta-lactones contain, in addition to carbonoxy structure and hydrogen and carbon atoms, other elements such as oxygen, nitrogen, sulfur and halogen which may be present in essentially unreactive structure such as nitro groups and ether linkages or in radicals containing reactive hydrogen such as amino and hydroxy. Examples of such latter compounds are alpha or beta-nitrophenyl-beta-propiolactone; beta-(o-nitro-m-chlorophenyl)-beta-propiolactone; beta-(o-nitro-m-methoxyphenyl)-beta-propiolactone; alpha-hydroxy-beta-phenyl-beta-propiolactone and alpha-bromo-beta-beta-dimethyl-beta-propiolactone-alpha-carboxylic acids.

It is thus seen that the invention contemplates the reaction of any of the generic class of beta-lactones with any of the generic class of acyl halides, and is generic to the chemical compounds which may be defined as beta-acyloxy acyl halides and which are prepared by this reaction. Accordingly, it is not intended that the invention be limited to the specific details set forth hereinabove but only as defined by the spirit and scope of the appended claims.

We claim:
1. The method of preparing a beta-acyloxy acyl halide which comprises reacting an acid halide of the structure

$$R'-C(=O)-X$$

wherein R' is a hydrocarbon radical and X is halogen with a beta-lactone of the structure

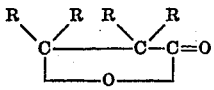

wherein each R is a member of the class consisting of hydrogen and alkyl, cyclo-alkyl, aryl and aralkyl hydrocarbon radicals.

2. The method of preparing a beta-acyloxy propionyl chloride which comprises reacting an acid chloride of the structure $$R'-C(=O)-X$$

wherein R' is a hydrocarbon radical and X is chlorine, with beta-propiolactone.

3. The method of preparing a beta-acyloxy propionyl chloride which comprises reacting an acyl halide of the structure $$R'-C(=O)-X$$

wherein R' is a saturated aliphatic hydrocarbon radical and X is a chlorine atom with beta-propiolactone.

4. The method of preparing beta-acetoxy propionyl chloride which comprises reacting acetyl chloride and beta-propiolactone.

5. The method of preparing beta-acetoxy propionyl chloride which comprises reacting acetyl chloride and beta-propiolactone at a temperature of about —30 to 30° C.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,053,269 | Dietrich et al. | Sept. 8, 1936 |

OTHER REFERENCES

Anschutz, "Berichte," vol. 36 (1903), page 467.
Anschutz, "Berichte," vol. 37 (1904), page 3973.
Vol'fson, "Chem. Abstracts," vol. 38 (1944), pages 3254–3255.
Blaise et al., "Annales de Chem." (8), vol. 17, page 394.